United States Patent
Hunter et al.

(10) Patent No.: US 9,954,384 B2
(45) Date of Patent: Apr. 24, 2018

(54) INSTRUMENTED SUPER-CELL

(71) Applicant: Nucleus Scientific Inc., Cambridge, MA (US)

(72) Inventors: Ian W. Hunter, Lincoln, MA (US); Serge R. Lafontaine, Lincoln, MA (US); Brian D. Hemond, Cambridge, MA (US); Adam Wahab, Cambridge, MA (US)

(73) Assignee: Nucleus Scientific Inc., Cambridge, MA (US)

( * ) Notice: Subject to any disclaimer, the term of this patent is extended or adjusted under 35 U.S.C. 154(b) by 193 days.

(21) Appl. No.: 15/153,879

(22) Filed: May 13, 2016

(65) Prior Publication Data

US 2016/0336762 A1 Nov. 17, 2016

Related U.S. Application Data

(60) Provisional application No. 62/160,778, filed on May 13, 2015.

(51) Int. Cl.
| | |
|---|---|
| *H02J 7/00* | (2006.01) |
| *H01M 10/42* | (2006.01) |
| *H01M 2/10* | (2006.01) |
| *H01M 10/0525* | (2010.01) |
| *H01M 10/44* | (2006.01) |
| *H01M 10/46* | (2006.01) |

(Continued)

(52) U.S. Cl.
CPC .......... *H02J 7/007* (2013.01); *H01M 2/1022* (2013.01); *H01M 10/052* (2013.01); *H01M 10/0525* (2013.01); *H01M 10/4257* (2013.01); *H01M 10/44* (2013.01); *H01M 10/443* (2013.01); *H01M 10/46* (2013.01); *H01M 10/48* (2013.01); *H01M 10/486* (2013.01); *H02J 7/0004* (2013.01); *H02J 7/0047* (2013.01); *H02J 7/0063* (2013.01); *H01M 2010/4271* (2013.01); *H01M 2010/4278* (2013.01); *H01M 2220/30* (2013.01); *H02J 7/345* (2013.01); *H02J 2007/0096* (2013.01); *Y02T 10/7011* (2013.01)

(58) Field of Classification Search
CPC ....................................................... Y02E 60/12
USPC ........................................................ 320/107
See application file for complete search history.

(56) References Cited

U.S. PATENT DOCUMENTS

| | | | |
|---|---|---|---|
| 5,767,659 A | 6/1998 | Farley | |
| 6,949,843 B2 * | 9/2005 | Dubovsky | H02J 3/382 307/64 |

(Continued)

FOREIGN PATENT DOCUMENTS

EP 2600443 6/2013

*Primary Examiner* — Yalkew Fantu
(74) *Attorney, Agent, or Firm* — Occhiuti & Rohlicek LLP

(57) ABSTRACT

An energy storage system for use with an external device including: an energy storage cell; a microcontroller; an internal communication bus; an interface including two power terminals and a communications port electrically connected to the internal communication bus; power conversion circuitry for performing a charging operation during which energy is transferred from the power terminals to the energy storage cell and a discharging operation during which energy is transferred from the energy storage cell to the power terminals; and one or more sensors for monitoring one or more parameters of the energy storage cell, wherein it is all packaged to form a single, integrated unit.

22 Claims, 12 Drawing Sheets

(51) Int. Cl.
*H01M 10/48* (2006.01)
*H01M 10/052* (2010.01)
*H02J 7/34* (2006.01)

(56) References Cited

U.S. PATENT DOCUMENTS

| | | |
|---|---|---|
| 8,115,454 B2 * | 2/2012 | Cintra .................. H01M 10/052 320/107 |
| 8,541,122 B2 | 9/2013 | Fulop et al. |
| 2008/0136367 A1 | 1/2008 | Adest et al. |
| 2008/0272653 A1 * | 11/2008 | Inoue ........................ H02J 7/35 307/47 |
| 2009/0033284 A1 | 2/2009 | Chang et al. |
| 2009/0302681 A1 * | 12/2009 | Yamada .................... H02J 7/35 307/46 |
| 2010/0001693 A1 * | 1/2010 | Iida .................... G01R 31/3679 320/134 |
| 2010/0207571 A1 | 8/2010 | English et al. |
| 2010/0217551 A1 | 8/2010 | Goff et al. |
| 2012/0098481 A1 | 8/2012 | Hunter et al. |
| 2013/0181655 A1 * | 7/2013 | Yokoyama ................ H02J 7/35 320/101 |

* cited by examiner

| Transition | Variables | | | | | | | | Condition |
|---|---|---|---|---|---|---|---|---|---|
| | $V_A$ | $V_B$ | $I_B$ | T | External | SOC | SOH | Timeout | $\&$ = and  $\|$ = or |
| 1 | | $> V_{B,min}$ | | | Command | | | | $V_B$ & External |
| 2 | $> V_{A,min}$ | $< V_{B,max}$ | | | Command | < 100% | | | $V_A$ & $V_B$ & SOC & External |
| 3 | | | | | | | | One-shot | Timeout |
| 4 | | | | $> T_{max}$ | | | $< SOH_{min}$ | Watchdog | T \| SOH \| Timeout |
| 5 | | | | $> T_{max}$ $< T_{min}$ | | | | Periodic | Timeout |
| 6 | $> V_{A,max-boost}$ | | $< I_{B,min-boost}$ | $> T_{max}$ $< T_{min}$ | | $< SOC_{min}$ | | One-shot | $V_A \| I_B$ & Timeout) \| T \| SOC |
| 7 | $< V_{A,min}$ | | | | Command | 100% | | | $V_A \| T \| SOC \|$ External |
| 8 | | | | | | | | One-shot | Timeout |
| 9 | | | | | | | | Periodic | Timeout |
| 10 | | | | | | | | Periodic | Timeout |
| 11 | | | $> I_{B,max}$ | | | | $< SOH_{min}$ | Watchdog | $I_B \| SOH \| $ Timeout |
| 12 | $> V_{A,max}$ | | | | | | $< SOH_{min}$ | Watchdog | $V_A \| SOH \| $ Timeout |

Fig. 6C

| Register | R/W | Secure | Volatile |
|---|---|---|---|
| VA | R/W | N | N |
| VB | R | N | N |
| IB | R | N | N |
| T | R | N | N |
| SOC | R | N | N |
| SOH | R | N | N |
| VERSION | R | N | N |
| DUTY | R | Y | N |
| TIME | R/W | N | N |
| MODE | R/W | N | N |
| ... | ... | ... | ... |
| PARAM0 | R/W | Y | Y |
| PARAM1 | R/W | Y | Y |
| PARAM2 | R/W | Y | Y |
| ... | ... | ... | ... |

Fig. 7

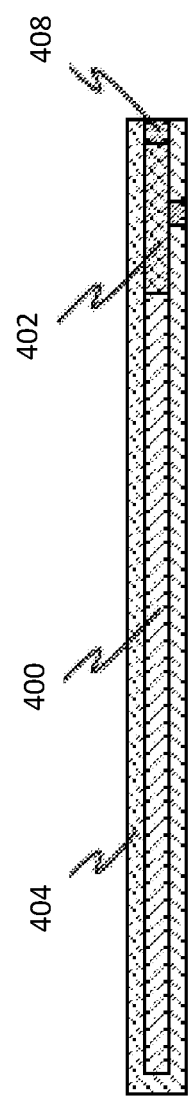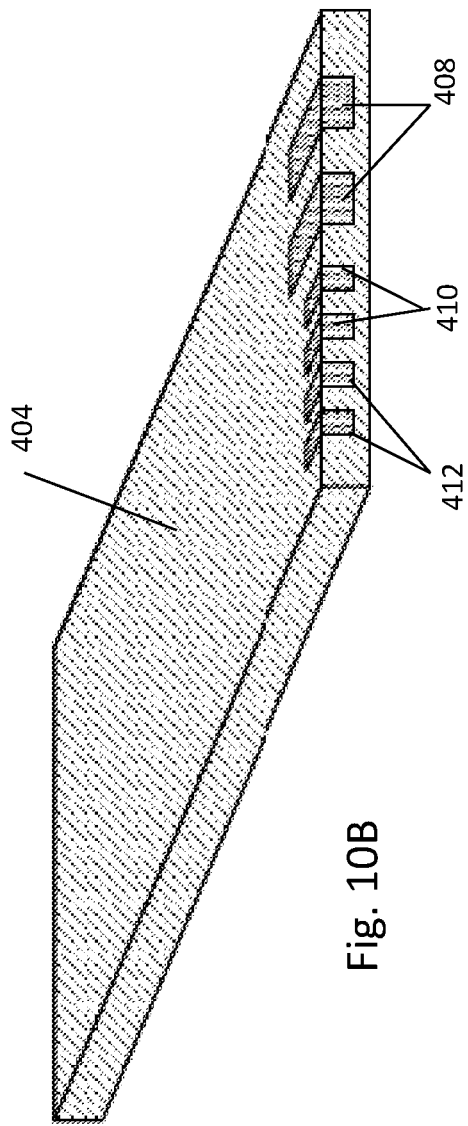
Fig. 10A
Fig. 10B

INSTRUMENTED SUPER-CELL

This application claims the benefit under 35 U.S.C. § 119(e) of Provisional Application Ser. No. 62/160,778, filed May 13, 2015, entitled "Instrumented Super-Cell," the entire contents of which are incorporated herein by reference.

TECHNICAL FIELD

Embodiments of the present invention generally relate to rechargeable energy storage devices that are based on one or more energy storage cells, such as, but without limitation, a lithium ion battery, a super-capacitor, an ultra-capacitor, a hybrid capacitor, or a pseudo-capacitor.

BACKGROUND

Portable electronic devices that rely on internal energy storage are often designed with significant constraints due to the underlying energy storage medium. For example, a cellular phone handset, often powered by a single lithium based electrochemical cell, must provide a significant amount of electronics in support of that cell. The cell must be charged regularly, requiring the phone to supply charge controller. The terminal voltage of the cell varies as a function of state of charge, requiring the phone to provide voltage regulation and conversion circuitry. The phone must likewise be measuring cell current for purposes of state of charge estimation

SUMMARY

What is described herein is an energy storage system that shall be referred to generally as a super-cell. The super-cell is typically used as a rechargeable power source for a load or host device, which is any system that might employ rechargeable batteries or energy storage devices, including for example, laptops, smartphones, electric vehicles, power tools, home appliances, etc. The super-cell abstracts the energy storage system away from the load or host device, while providing that host device with additional energy management abilities, such as improved charging algorithms and enhanced energy capacity estimation.

In general, in one aspect, the invention features an energy storage system for use with an external device. The energy storage system includes:
an energy storage cell; a microcontroller; an internal communication bus over which the external device can communicate with the microcontroller; an interface through which the external device electrically connects to the energy storage system, the interface including two power terminals and a communications port electrically connected to the internal communication bus; power conversion circuitry connected between the power terminals and the energy storage cell, the power conversion circuitry for performing a charging operation during which energy is transferred from the power terminals to the energy storage cell and a discharging operation during which energy is transferred from the energy storage cell to the power terminals; and one or more sensors for monitoring one or more parameters of the energy storage cell. The microcontroller is programmed to control the operation of the power conversion circuitry during the charging and discharging operations based on the one or more monitored parameters of the energy storage cell, and the energy storage cell, the power electronics, the microcontroller, the interface, the internal communication bus, and the one or more sensors are packaged to form a single, integrated unit.

Other embodiments may include one or more of the following features. The energy storage system also includes an epoxy encapsulating the energy storage cell, the power conversion electronics, the microcontroller, the interface, the internal communication bus, and the one or more sensors to create the single, integrated unit. Alternatively, or in addition, the energy storage system includes a housing surrounding and containing the energy storage cell, the power conversion electronics, the microcontroller, the interface, the internal communication bus, and the one or more sensors to create the single, integrated unit.

Also, in one or more other embodiments, the microcontroller is programmed to employ a charging model and the monitored one or more parameters from the one or more sensors to control the power electronics when performing the charging operation. The microcontroller is programmed to operate the power conversion electronics as a boost converter during the discharging operation. The microcontroller is programmed to operate the power conversion electronics as a buck converter during the charging operation.

In yet other embodiments, the energy storage system includes a low power supply that is part of the single, integrated unit and wherein the interface includes low power terminals electrically connected to the low power supply. The energy storage cell is a lithium cell. The one or more sensors are selected from the group consisting of a voltage sensor arranged to sense a voltage of the energy storage cell, a current sensor arranged to sense a current of the energy storage cell, a reference electrode within the energy storage cell, and a temperature sensor arranged to sense a temperature of the energy storage cell. The internal communication bus is a digital communication bus for which the communication protocol is an I²C communication protocol. The energy storage system also includes a plurality of registers which during operation store one or more of the one or more monitored parameters of the energy storage cell, wherein at least some of the plurality of registers are readable by the load device via the internal communication bus. The plurality of registers also includes a subset of registers for storing parameters characterizing a charging model that the microcontroller uses to control the charging operation, wherein the subset of registers is in volatile memory. During operation the plurality of registers stores a state of charge for the energy storage cell. The microcontroller is further programmed to use the one or more monitored parameters of the energy storage cell to compute a state of charge for the energy storage cell. The microcontroller is further programmed to compute a state of health for the energy storage cell and use the computed state of health to manage the charging operation. The state of health is based on a energy storage capacity of the energy storage cell as determined by the microprocessor. The power conversion circuitry includes a bidirectional half-bridge conversion circuit. The microcontroller is further programmed to perform critical limit checks using the one or more monitored parameters and to perform fault handling if a problem in operation is detected.

One advantage is that a load device using a super-cell can be designed to accept any super-cell without concern for the underlying storage technology. The super-cell interface presented to the load device avoids the need to make design decisions based on specific energy storage technologies.

In addition, a load device using a super-cell achieves significant savings in both bill of materials and design complexity. Many of the features that a load device would need to implement for maintenance of its energy storage system (e.g. charge, discharge profiles), as well as voltage regulation of the cell's terminal voltage to the voltage used by the load device, are no longer necessary. The super-cell contains all of the charge/discharge, standby power, and estimation components necessary.

In addition, by removing the energy management constraints on load device circuit design, the super-cell frees the load device design from requiring a specific type of energy storage (e.g. cell capacity, power rating, voltage). The load device can be designed to operate from a super-cell, and a super-cell with different characteristics may be substituted in at any time with no modification needed to the load device circuitry. The super-cell interface and abstraction makes this possible.

The load device need not incorporate any number of voltage regulators, charge estimators, etc. Due to the super-cell interface/abstraction, the load device may charge or discharge the super-cell at any voltage within the super-cell's load range through the super-cell's power terminals: the load device simply informs the super-cell of its requirements digitally through the super-cell's communication bus.

The load device may also draw standby power from the super-cell's high efficiency standby regulator, eliminating the need for the load device to implement such hardware internally.

The super-cell, using its onboard power electronics and microcontroller, is capable of safely increasing charge rates beyond what is typically considered acceptable for lithium cells. As such, the load device can be designed for rapid charge rates, which ultimately improve user experience in the form of shorter delays before a device's energy is fully replenished.

Another parameter of importance to most device users is an accurate estimation of the remaining energy capacity of the device. A consumer electronics device, such as a laptop, needs to be able to communicate to the user an accurate estimate of remaining energy and/or accurate estimate of run time, such that the user may make informed decisions about when to charge their device. A super-cell can provide this and other useful information to the user via the load device.

A device powered by a super-cell is intrinsically safer than devices using discrete lithium cells. The super-cell, encapsulated in a single package, contains sophisticated methods of preventing a cell from being used inappropriately and therefore perhaps dangerously. The super-cell is constantly measuring its environment and electrical parameters to prevent a dangerous situation from arising.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6C is a table showing the conditions which trigger the transitions within the state diagram of FIG. 3B.

FIG. 7 shows some of the more relevant registers within the super-cell.

FIG. 10A is a cross-sectional view of an embodiment of the super-cell in which the energy storage cell and the electronics are encapsulated in epoxy.

FIG. 10B is a perspective view of the embodiment of the super-cell shown in FIG. 10A.

DETAILED DESCRIPTION

Figure 1:
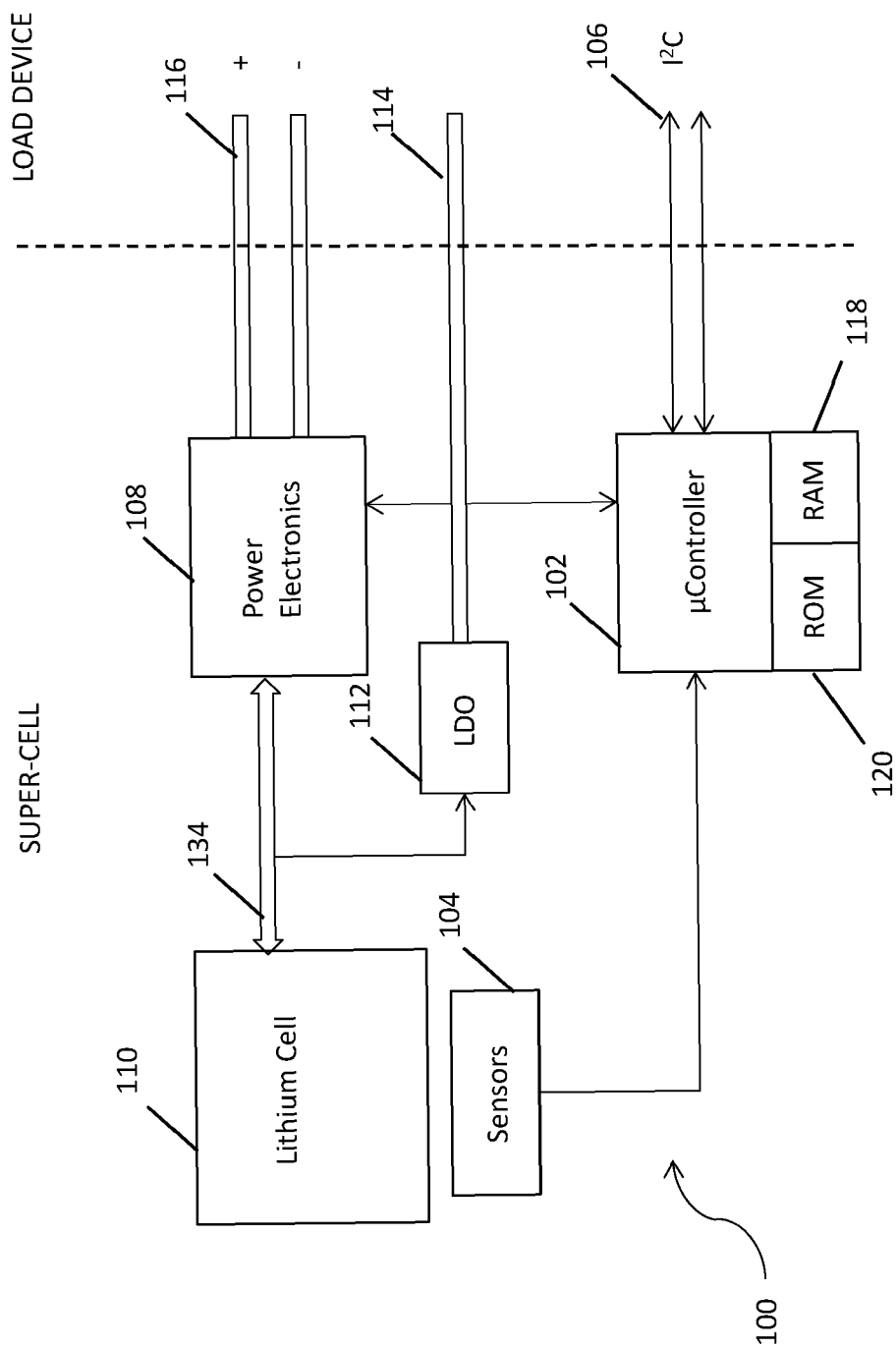
FIG. 1 is a block diagram of the basic structure of the super-cell.

Referring to FIG. 1, the energy storage system or super-cell 100 includes one or more energy storage cells 110 that may be, for example, electro-chemical batteries and/or super-capacitors. In the described embodiment, the super-cell is designed using a commercial off-the-shelf lithium iron phosphate electrochemical battery. The cell capacity is 2200 mAh with a nominal terminal voltage of 3.3 V.

The super-cell 100 is also instrumented with electronics including a computation unit such as microprocessor or FPGA 102, a suite of sensors 104, a digital communication bus 106 for communications with external devices such as load devices, power electronics 108 to regulate the flow of energy between the energy storage system and the external load device, and a linear or low dropout (LDO) regulator 112 to provide a low voltage for running the onboard microcontroller as well as external keep-alive circuitry in the load device.

The purpose of the super-cell is to abstract the energy storage system away from the load or host device, while providing that host device with additional energy management abilities, such as improved charging algorithms and enhanced energy capacity estimation. The load or host device is any system that might employ rechargeable batteries or energy storage devices, including for example, laptops, smartphones, electric vehicles, power tolls, etc. When operating from a super-cell, the load device is decoupled from the underlying energy storage technology, the required charging/discharging parameters, voltage levels, etc., as the super-cell handles all of this internally. The super-cell provides a uniform, abstract interface to the load device irrespective of the underlying energy storage medium, while eliminating many of the ancillary components typically found in a load device (e.g. voltage regulators, charging circuitry, etc.).

Internally, the super-cell may also provide other benefits to the load device in which it is used. The onboard microcontroller within the super-cell is tightly coupled to the energy storage medium through sensors (such as temperature, pressure, acceleration, etc.) as well as electrodes embedded within the energy storage medium. These may include the primary cell electrodes and one or more reference electrodes. The microcontroller is programmed to make measurements against the energy storage medium for monitoring and predictive purposes (e.g. recording charge/discharge history, gauging the cell health, predicting cell lifetime, guarding against abnormal events, etc.). This aggregate data is also stored and available to the host system through the communications interface.

The super-cell's integrated power handling components also provide the load device with a regulated output voltage, safety circuitry, and charge circuitry, thereby minimizing the amount of additional components required within the load device. The super-cell itself manages energy flow such that when the load device is being charged, it can pass the raw charge energy on to the super-cell.

Microcontroller

In the described embodiment, the microcontroller 102 is a 32-bit ARM Cortex M4F microprocessor, manufactured by STMicroelectronics (STM32F334).

The microcontroller is tasked with performing calculations necessary to accurately model the behavior of the energy storage cell by measuring a set of relevant, monitored operating and environmental parameters of the cell. The microcontroller also measures the cell's environment (e.g. charge voltage available) and mediates the flow of energy into or out of the cell by directly controlling the power electronics. Additionally, the microcontroller communicates with the load device in order to determine what the needs of the load device are.

The microcontroller modulates the power electronics directly by means of an onboard, high-resolution, timing system. The modulation of the power electronics, and hence energy flow through the electronics, is determined by the microcontroller's measurements of the super-cell's environment, including the needs of the load device (communicated via digital communication bus), by the availability of energy for storage, and by the super-cell's physical environment parameters.

The microcontroller on the super-cell is actively involved in making continuous measurements of the status of the underlying energy storage medium. Proper estimation of the state of an energy storage device is very important particularly with the emergence of the use of more recent high-energy, high-power lithium-ion cells and their use in modern devices such as electric vehicles (EV), smart phones, tablets, laptops, power tools, and a large range of consumer devices. Modern electrochemical cells often use a highly reactive metal such as lithium, and are prone to catastrophic failures when charged or discharged improperly, submitted to high temperatures or submitted to large impacts. The power that can be obtained from a cell is temperature dependent, and cells degrade much more rapidly if charged or stored at high temperatures. Typically, a fully charged lithium-ion cell stored at 60° C. for 3 months will lose 40% of its capacity. In most applications, users expect to know the amount of charge left in a cell and plan their usage accordingly.

It is also a well-known fact that cells degrade more rapidly when fully charged or fully discharged, particularly if left for a long period of time in that state. In order to maintain optimal battery life normally a battery depth of charge is maintained around 50% of its full capacity. Cells are normally used between 10%-90% of their full capacity, or even narrower range. It is estimated that using only 50% of the total battery capacity adds approximately 1000 cycles of lifetime. Therefore, carefully controlling a cell lifetime requires knowledge of its state-of-charge (SOC). However, charging too frequently also potentially deteriorates a cell. The optimal solution for extending a cell life consists in measuring degradation from monitoring cell parameters and internal state for the purpose of trading some depth of discharge or equivalently effective battery capacity for slightly more frequent charging.

The onboard microcontroller within the super-cell is programmed to take the above-mentioned considerations into account and both manage the use of the battery cell appropriately and provide the information that the user needs or would find useful regarding the condition or state of the cell.

Managing electrochemical energy storage devices requires properly characterizing the device itself in the form of a model that predicts how cell variables such as current, voltage, charge vary with each other, and to be able to measure, observe or estimate such variables, or the state of the cell. Estimating the current level of charge is from a user standpoint important as it determines how much longer a device can be used before complete discharge. The amount of charge is normally estimated by combining a number of methods, including estimating the relative amount of charge and the capacity and the amount of charge entering or exiting the cell. The cell capacity itself varies with temperature. Measuring as many cell variables as possible directly inside the cell provides a better estimate of the state of the cell, improves the cell model, helps to optimize the cell lifespan, and provides the user with more accurate information about the amount of energy left in a cell.

Memory

Referring again to FIG. 1, the microcontroller, which contains RAM 130, also contains non-volatile flash ROM 132. The ROM memory 132 is used to record the cell history, which is relevant information for, among other things, determining the age and useful capacity of the cell.

A cell's characteristics and dynamic response change with time. Keeping data in non-volatile memory provides the additional benefit of being able to retrieve data from a large population of super-cells and from that retrieved data building better statistical models of cell aging.

In addition, the microcontroller also stores much of the operating code in flash ROM 132 as well. The ROM 132 may be updated (e.g. 'firmware updates') by sending appropriately generated firmware to the microcontroller through the super-cell's communications interface 114. And the microcontroller verifies that the firmware is legitimate before applying the update.

Power Electronics

The power electronics 108 accomplishes the power handling through one or more integrated, high frequency switching converters. The high frequencies allow for miniaturization of the switching converters, the switches themselves, as well as any required magnetics. The switches may be silicon, silicon-carbide, or gallium-nitride based switches.

Figure 2:
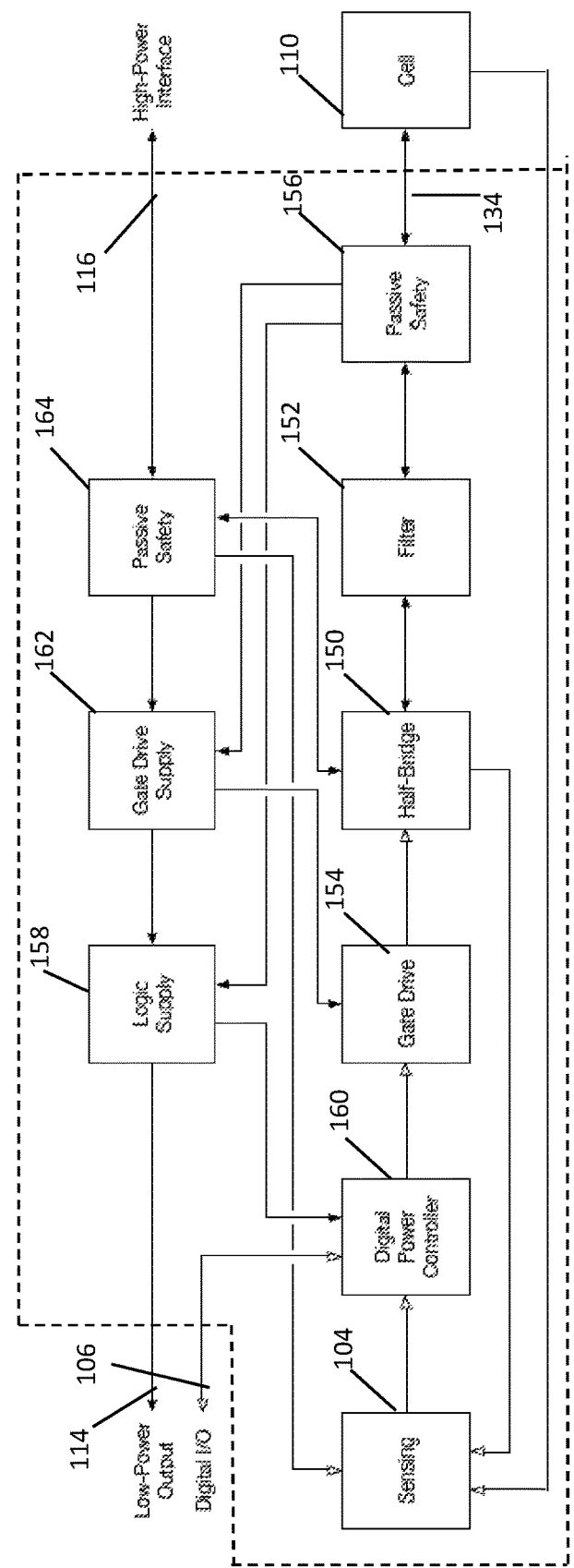
FIG. 2 is a more detailed block diagram of the super-cell.

Referring to FIG. 2, a more detailed illustration of the internal design of the power electronics is shown. The power electronics of the described embodiment contains a bidirectional, half-bridge power conversion circuit 150 that stands between the lithium cell terminals 134 and the super-cell terminals 116, a gate drive module 154, and a gate drive supply 162. The half-bridge power conversion circuit 150 includes two gallium-nitride FET transistors in half-bridge configuration driving an LC filter 152. Depending on the signals provided by a digital power controller 160 (which is implemented by the previously described microcontroller), the half-bridge operates ether as a buck converter to transfer charge from the load device to the storage cell or as a boost converter to transfer power from the storage cell to the load device.

The gate drive circuit 154, which is powered by a gate drive supply 162, contains level-shifting buffers that translate the logic-level gate drive signals from the digital power controller 160 into signals that are capable of driving the gates of the transistors within the half-bridge power conversion circuit 150. In the described embodiment, one of the half-bridge circuit transistors requires a floating gate drive signal. The gate drive circuit 154 handles this level-shift. The gate drive circuit 154 also serves as a buffer as it provides sufficient current to quickly charge the half-bridge transistor gates during high-frequency switching.

The FET switch timing is provided directly by the digital power controller 160. The switch timing from the digital power controller 160 is based on the model that is employed for the energy storage cell 110. Depending on the timing that the digital power controller 160 uses to drive these switches, energy can be made to flow into the super-cell from any source whose voltage is above the lithium cell terminal voltage (buck mode), or out of the cell at any voltage exceeding the lithium cell terminal voltage (boost mode).

Low Power Supply

The super-cell's power electronics stage is designed to make use of the full power capabilities of the lithium cell that stores the super-cell's energy. Thus, the power electronics, while efficient under higher loads, would be a relatively inefficient means of powering low drain circuits, such as the onboard microcontroller or other keep-alive circuits in load devices. This is due to the losses inherent in switching electronics. Under very light loads, the power losses involved in switching can exceed the total power of the load.

To address this, the power electronics also incorporates a low output logic supply 158 for running the digital power controller and load device keep-alive circuits operational when the main power electronics stage is shut down. This logic supply 158 corresponds to the LDO circuit 112 depicted in FIG. 1. The onboard microcontroller is kept in a low drain standby or sleep mode when the super-cell is not being used, so as to maximize the shelf life of the energy storage cell 110.

The discrete gate drive supply 162 is used because the gate drive circuitry 154 requires a higher voltage than what is provided by the logic supply 158. Note that the logic supply 158 may be powered by the gate drive supply 162, which occurs when the cell voltage drops below the minimum input voltage required by the logic supply 158 and an externally supplied voltage is present at the high-power interface 116. Under normal conditions, externally supplied voltages at the high-power interface may exceed the maximum input voltage rating of the logic supply; so, the gate drive supply serves as an intermediate power conversion stage as it is rated for the full input voltage range.

The digital power controller 160 may also drive the power control electronics in a mode that is designed to dissipate energy thermally. This is done in cases where the cell needs to be discharged (e.g. if a super-cell is used in a series string of super-cells charged by a common current), and in cases when the performance of the super-cell would be boosted at higher temperatures (such as operation in cold environments).

In the power electronics, the converters are capable of accepting a wide range of input voltages as well as providing a wide range of regulated output voltages. The desired output voltage is selected by the load device by writing the desired output voltage to a corresponding register within the super-cell. Thus, a load device using a super-cell can simply apply any available voltage to the super-cell for charging purposes, as well as request any voltage within the range of the super-cell's electronics to power itself. A load device which uses the super-cell need not incorporate a wide range of cell maintenance hardware as is typical of load devices that are powered by a battery cell without these capabilities.

The switching electronics also serve as a buffer between the energy storage cell and the load device, providing a certain level of protection against e.g. short circuits in the load, improper charging voltages, etc. Part of this protection is provided by a passive safety circuit 156 that is between the filter 152 and the terminals 134 to the energy storage cell 110 and another passive safety circuit 164 that sits between the half-bridge circuit 150 and the high power interface 116 to which the load device is connected. The passive safety circuits include diodes to provide reverse current protection and zener diodes to provide overvoltage protection. In addition, the digital power controller 102 is engaged in repeatedly measuring the energy storage cell's terminal voltage, current, and other parameters, and is programmed to reduce or stop current flow should the parameters drift out of specification.

Small, high frequency active switches are readily available for use in voltage conversion. Recent advances in semiconductor technology have led to the wide availability of high frequency, low loss switches which can be configured in a range of topologies, including but not limited to, buck conversion for energy storage charging, buck/boost for discharge, or flyback for high boost ratio applications.

Interface

The super-cell, of which there can be many variants, is designed to present a uniform interface to the load device, irrespective of the actual components used within the super-cell. The super-cells are single, integrated units that all have the same form factor and dimensions regardless of internal variations in the energy storage cells that are used or variations in the design and construction of the electronic circuitry. The super-cell interface includes the pair of power terminals 116, such as might be found on a traditional lithium cell, the two-wire bidirectional digital communication bus 106, and a regulated, low voltage, low current output 114 suitable for keeping load device standby electronics alive while minimizing drain on the super-cell. These are also found at the same locations on all interchangeable super-cells so that a super-cell using one energy storage cell type may be readily be swapped out for another super-cell using a different energy storage cell type.

The digital communication bus in the super-cell is implemented using an I$^2$C physical layer. I$^2$C is simple and well supported by most modern microprocessors. It is a relatively slow, but robust, widely used means of exchanging information between two microprocessors. The super-cell communicates over I$^2$C using an application programming interface (API). The load device uses the API to control the super-cell.

A typical load device would use the super-cell power terminals for running onboard circuitry, the LDO terminal for running standby circuitry, and the communications interface for control. Most modern consumer electronics devices use microprocessors for control, and a load device's microprocessor would be connected to the super-cell through the communications interface as well. This connection allows the load device to make requests to the super-cell, such as enabling the super-cell power electronics to provide a regulated output voltage, or to use available energy for charging. The load device's microprocessor will also be able to interrogate the super-cell's model and sensors to determine the super-cell's predicted remaining energy capacity, temperature, future energy availability, cycle life, etc.

Sensors

The super-cell is designed to change its operation based on measureable environmental parameters. The super-cell's microcontroller is tasked with making the measurements using the number of sensors which make up the sensing circuitry 104. The available sensors include voltage sensors, current sensors, temperature sensors, and possibly others that are described below.

The microcontroller and associated electronics on the super-cell are ideally suited to improving cell measurements and operational operating parameters due to the tight coupling of microcontroller, energy storage medium, and sensors.

Voltage Sensing

Cell electrical characteristics are of primary importance to the operation of the super-cell. The microcontroller accurately measures the terminal voltage of the lithium cell through the primary cell electrodes.

The super-cell also makes use of reference electrodes in addition to monitoring cell voltage via the two primary electrodes. The purpose of these additional reference electrodes is to more accurately monitor the operation of the energy storage medium.

A cell degrades as a function of the voltage at which it is charged. Most lithium-polymer cells are charged up to a potential ranging from 4.0V up to 4.4V. Higher potentials lead to greater capacity and greater energy densities but shorter lifetime. Hence maximizing the amount of energy provided by a cell over its useful lifetime involves trading off charging voltage for cell capacity. When the energy storage cell is used dynamically where load or charging current varies quickly, internal electrodes may vary significantly in voltage. It is therefore useful to monitor one or more internal electrode voltages to optimize battery usage.

As discussed in U.S. Pat. No. 8,541,122 to Fulop et al., and incorporated herein in by reference, a reference electrode may serve several purposes. In lithium-ion cells when the positive electrode reaches too high a potential the electrolyte may degrade. When the potential at the negative electrode falls too low, lithium plating may occur. Lithium plating typically occurs at very high charging rates, and is one of the major factors contributing to cell degradation. By measuring independently the internal negative electrode potential it becomes possible to reduce or stop the charging when the negative electrode reaches a critical level.

Also as described in U.S. Pat. No. 8,541,122, a reference electrode allows for a more accurate determination of a cell state-of-charge. Typically, some chemistries degrade faster at low or high state-of-charge, and it is preferable to avoid these extreme conditions. Materials and methods to create such reference electrodes are also discussed in that patent.

At high current rates, an ohmic voltage drop occurs as the current passes from external leads that are soldered or welded to battery tabs that are themselves internally connected to electrodes. Due to this ohmic drop the actual electrode potential may differ significantly from the voltage at the battery external tabs. The typical technique used to prevent such error in voltage measurements involves using independent sense leads from the main current carrying leads. However, the most accurate method of measuring the battery electrode potentials is by making measurements inside the cell before the voltage drops occur in external connections.

Cell Current Sensing

Cell current is important in fitting a model to a cell, estimating the amount of charge left in the cell, or determining when a current exceeds safety limits. By measuring current over its life it becomes possible to improve predictions on how it evolves. Additionally, cell impedance is often used as a tool to monitor the cell health status. Impedance calculation typically involves modulating cell current or voltage sinusoidally, extracting the real and imaginary components of the impedance, and plotting the root locus of the components.

The impedance measurement mentioned above is only one of the many tests that can be performed which require measuring cell current. Other tests include more advanced nonlinear system analysis (see US Pat. Pub. 2012/0098481, incorporated herein by reference). In performing nonlinear system analysis, an optimal current variation is designed to characterize the cell or electrode, drawing for example a current using power transistors inside the cell. Subsequently, one of the nonlinear system identification techniques (such as fitting Wiener or Volterra series representation, using block-structured methods, or using a general nonlinear minimization technique) is used to adjust nonlinear system parameters to best represent the dynamic behavior of the system.

Cell current can be measured using many different techniques. One approach uses a current sensing power resistor, an instrumentation amplifier, and high precision analog-digital converter to digitize the current. Alternatively, one could also measure cell current through the parasitic resistance of the inductor in the power electronics.

Temperature Sensing

Temperature of the super-cell and its environment is also a critical parameter. The microcontroller makes temperature measurements including the temperature of the lithium cell, external (environmental) temperature, and temperature of the power electronics, using thermistors.

In addition to extreme electrode potentials, high temperature is one of the main causes of cell degradation. A cell's temperature may increase with ambient temperature and also with Joule heating inside a cell when the cell is charged or discharged. For example, in a typical lithium-ion cell keeping the cell at 60° C. for 3 months may result in up to 40% capacity loss. Joule heating presents a particular problem at higher currents because the heat generated inside a cell must diffuse out, and a temperature gradient is established inside the cell. The temperature in the middle of a cell may be significantly higher than the temperature at the cell packaging level. While it is relatively easy to measure the external cell temperature, obtaining the temperature inside a cell can only be achieved with an embedded temperature sensor, such as resistive sensor or thermocouple. Generally, resistive sensors would be easier to use as thermocouples require a zero-degree reference voltage to calculate the absolute temperature.

The cell capacity of lithium-ion cells varies with temperatures. In cold ambient temperatures it is sometimes beneficial to condition a battery before use by heating the battery. Furthermore, charging a lithium-ion cell below certain critical temperatures may also lead to lithium plating of the electrodes. Cells charged under these conditions may appear to charge normally but lithium plating occurs which may compromise the safety of the cell. The super-cell's onboard power electronics is used to actively raise the energy storage medium temperature by dissipating some of the stored energy through joule heating.

Recent advances in the miniaturization of various relevant sensor technologies enable an even more practical realization of the super-cell concept. Microcontrollers incorporating high-performance low-power 32-bit microprocessors, various digital and analog peripherals, and non-volatile storage are available in wafer-level chip scale packaging measuring 1.6 mm by 2.0 mm. The aforementioned chip-scale microcontrollers contain analog-to-digital converters and internally connected temperature sensors that may be sufficient for measuring the cell temperature. External temperature sensors, semiconductor or resistive, may also be used instead or to supplement the integrated sensor.

Accelerometer

Additional physical parameters are of interest as well and other embodiments of the super-cell contain sensors for monitoring those additional parameters. For example, acceleration and shock are of significant interest, as electrochemical cells are subject do damage if accelerations are too great, such as might occur if the cell is dropped. If a sufficiently high shock load is measured, the super-cell's microcontroller is programmed to reduce performance until such time as the super-cell is deemed to be safe for operation at the higher performance level.

Shocks or cell punctures may lead to unsafe events such as chemical spillage or internal shorting of electrodes, leading potentially to thermal runaway. The microcontroller also records a history of such events in a corresponding register where it can be read by the load device. By logging a history of shocks and vibrations incurred by a cell, it becomes possible to identify cells that are more prone to failure or potentially explain a cell malfunction.

The inclusion of 3-axis accelerometers and gyroscopes inside a super-cell provides the ability to monitor the shocks and vibrations to which the cell is subjected.

State-of-the-art tri-axial MEMS accelerometers integrate signal processing and powers saving features are in 2.0 mm by 2.0 mm chip-scale packages that are as thin as 0.5 mm. Acceleration measurements may be transferred to the microcontroller via a serial interface. Threshold-based interrupts may be configured to bring a microcontroller out of a low-power state to perform diagnostics should the cell experience a sudden acceleration of substantial magnitude.

Deformation

Vibrations and shocks may also result in mechanical cell deformation which could be detected using appropriate sensors, such as strain sensors. In addition, when cells encapsulated as pouches release gases, they often inflate since pouch packaging does not typically include any venting mechanism. Detecting pouch strains or deformations or detecting the detachment of the pouch from electrodes can be used by the microcontroller as early indicators of cell failure.

Resistive strain gauges provide one way to measure cell deformation and deduce pressure. One or more strain gauges may be incorporated into the cell packaging either by directly depositing insulated conductive traces or by mounting prefabricated thin-film strain gauges using adhesive. Low-power, high-resolution chip-scale analog-to-digital converters that provide 16-bits or more may be used with a chip-scale instrumentation amplifier, or integrated programmable gain amplifier, to digitize the strain gauge output. Alternatively, other approaches may be used where the strain gage resistance (R) is measured via a parallel capacitor (C) which forms a RC circuit whose time constant is measured via digital timing circuits. These approaches avoid the need for instrumentation amplifiers and benefits from the precision of digital timers. In the case where a discrete analog-to-digital converter is used, measurements may be transferred to the microcontroller for processing and storage via a serial interface. Similarly, the analog-to-digital converter may be used to monitor cell potential and current. Current measurements may be integrated over time by the microcontroller as a means of Coulomb counting to estimate a cell's state of charge.

Compressive stack pressure is used to maintain contact between the elements of cells and to prevent delamination and deformation, particularly in the case of cell pouches. Typically, a pressure of 0.1-5 MPa is maintained for this purpose. Dynamic stack pressure is one component of cell degradation that is frequently neglected, but nevertheless important to measure. For cylindrical cells that are enclosed in a metal structure a pressure buildup may occur inside the cell as it heats or gases, such as hydrogen, are produced, which could ultimately lead to cell venting. In some embodiments, the microcontroller uses one or more stain gauges to measure cell pressure from this generates an indicator of cell degradation that is stored in an internal register for access by the load device.

Software Flow

Figure 3:
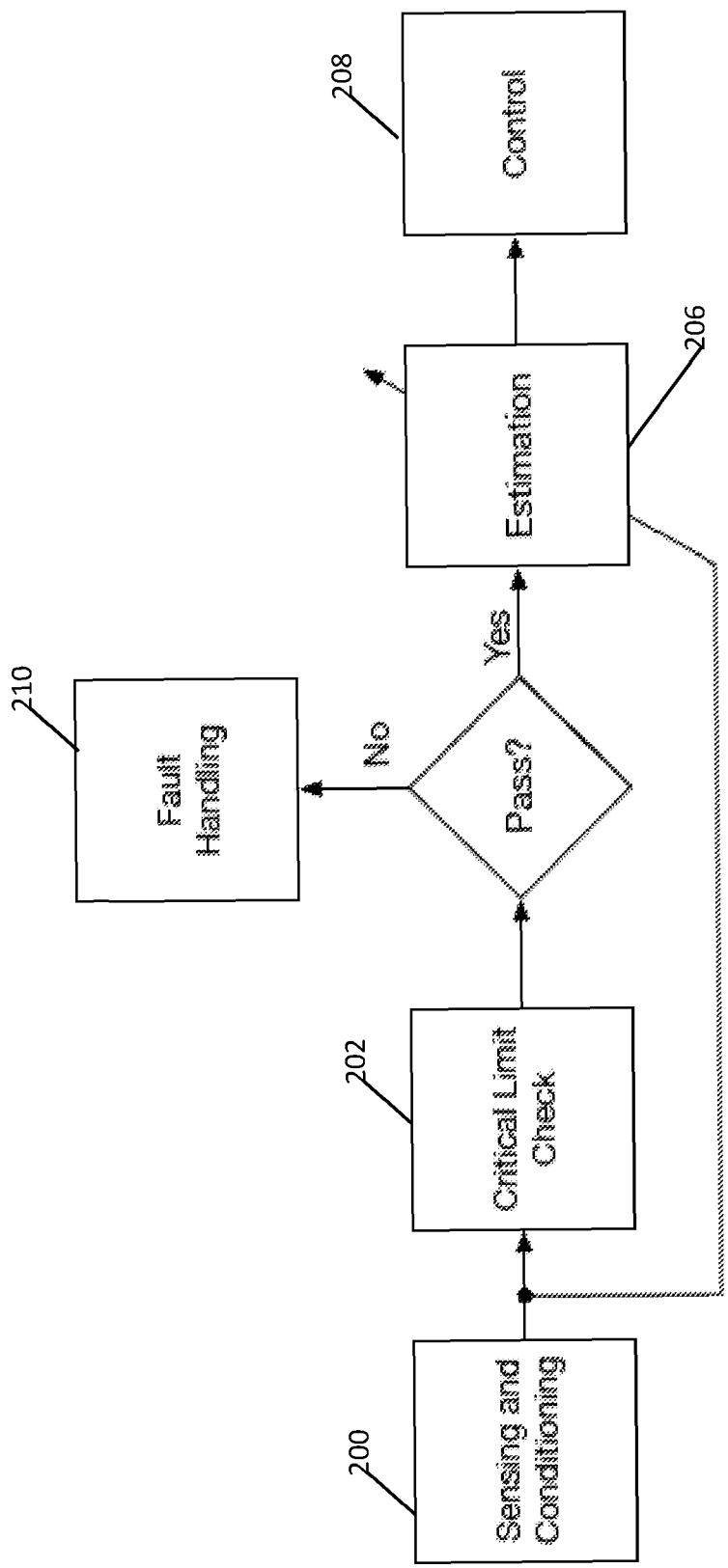
FIG. 3 is a flow chart of the software running within the super-cell.

FIG. 3 is a flow chart of the operation of the super-cell during an execution loop of the software program running on the microcontroller. During a sensing and conditioning stage (block 200), the super-cell reads the relevant operating parameters from the sensors and conditions those readings for use by the microcontroller. The monitored values include at least the temperature of the cell, current of the cell, and the voltage on the high power interface to which the load device is connected. Then, the microcontroller tests these monitored parameters to determine whether any of them exceed critical limits that have been specified for the operation of the super-cell (block 202). It tests whether the temperature of the energy storage cell falls outside the acceptable temperature range, whether the current into the energy storage cell exceeds a predefined limit, and whether the voltage being supplied by the load device has gone above a maximum safe level. If any of the tests fail, i.e., critical limits are exceeded, the microcontroller initiates a fault handling routine (block 210) to address the problem. The action of the fault handling routine might be to simply halt the functioning of the power conversion function and provide an alert for the load device, or it might involve reducing the charge transfer operation to allow the cell temperature to drop, or it might simply report the condition to the load device by setting a flag in the appropriate register in memory. In other embodiments, other sensed parameters such as strain, acceleration, pressure such as those described above, could also be used to define critical limit tests that provide a basis for halting normal operation of the power conversion functions.

If it is determined that no critical limit has been violated, the microcontroller runs an execution routine that employs a model of the energy storage cell to generate control signals (block 206) which control the switching of the FETs with the power conversion circuitry perform the boost (or buck) conversion function (block 208) during the next period of time. In the described embodiment, the cell model is a simple CCCV (Constant Current, Constant Voltage) charging model. According to that model, the charging current is fixed at a constant level during a first phase of charging, and then when stored charge has reached a certain level, the power is supplied to the cell at a constant voltage until the cell is fully charged.

Of course, alternative models could also be used. An example of a more sophisticated model for controlling the charging of the cell and which would lead to both faster charging and a longer cell life is described in U.S. 2012/0098481, entitled "Apparatus and Method for Rapidly Charging Batteries," and incorporated herein by reference. This fast charge model employs a nonlinear dynamic representation of battery cell dynamics that evolves in time. Battery cell dynamics means the actual electrochemical behavior of the cell as a function of time under a manifold of battery conditions. By using nonlinear system identification techniques, it arrives at coefficients for the model that fits the model to the specific cell being charged. Then, using an objective function based on that fitted model, it employs an optimization technique to arrive a charging profile which is used to control the charging of the cell. As the charging takes place, the processor monitors various parameters of the cell being charged (e.g. temperature, currents, and voltages) and based on those monitored parameters and further use of nonlinear system identification techniques, it may revise the model that is being used to determine the charging profile. The fast charge model can also be used to predict state of charge as well as cell cycle lifetime, both of which are generally difficult to estimate but very useful knowledge for the load device. Many load devices (e.g. consumer electronics) have a method of indicating the state of charge to the user, and accuracy is important for determining the load device's run time.

Figure 4:
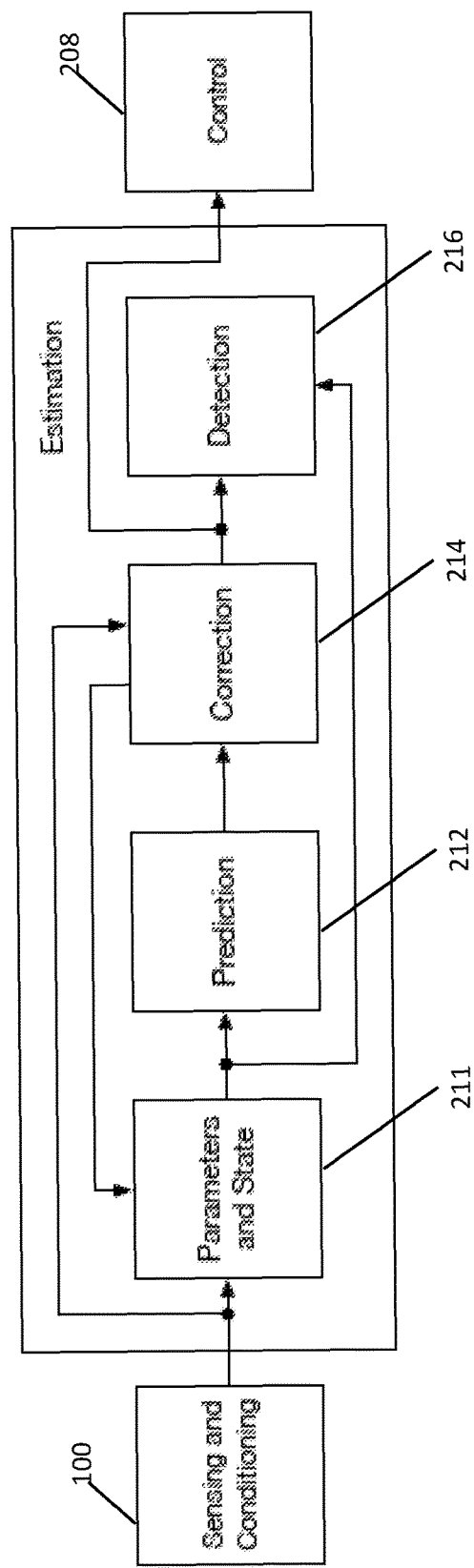
FIG. 4 is a flow chart of the operation of the estimation block shown in FIG. 4.

Referring to FIG. 4, the estimation phase basically implements a Kalman filter. During the estimation phase (block 206), the internal model of the energy storage cell is used to predict the behavior of the energy storage cell (block 212) based on energy flow into and out of that cell and cell voltages, as well as monitored environmental parameters, such as temperature (block 211). The model predictions are, in turn, corrected based on the monitored values (block 214). Then, the corrected parameters are used to generate commands to the control block (block 208) that control the charge transfer or charging process. For example, the commands might instruct the half-bridge circuit to change the duty cycle of the pulse-width modulated gate drive waveform.

The model outputs a value for the current that is designed to optimize energy flow into or out of the lithium storage cell for the purpose of optimizing the lithium cell's charge rates and cycle lifetime. In general, the estimation block gives a better estimate for the computed values by compensating for noise that is present in the measured values. The corrected values are also passed back to the parameters and state block at the end of the cycle and are used by the model to improve the model's predictions during the next repeat of the estimation routine.

The detection phase (block 216) step looks at trends within the history of corrected values to determine whether a change in the model occurs that signals a fault or a problem. And when such a fault or problem is detected during the detection phase, a fault handling procedure is called.

One key model-based optimization is the ability to rapidly charge certain types of lithium cells (each with its own characteristic model). By comparing the lithium cell behavior to the model behavior, it is possible to increase cell charge rates beyond what is typically acceptable for a given cell.

Another optimization is for safety considerations. If the microcontroller's cell model and the lithium cell behavior diverge, it is an early indication that an abnormal condition has occurred (such as physical damage) and the microcontroller can then take appropriate actions, such as reducing charge rates and/or signaling a fault condition to the load device.

As noted above, operational changes might include the throttling of power flows if measured parameters drift out of tolerance. This includes actions such as thermal throttling—decreasing charge or discharge rate if the temperature of the lithium cell or power electronics or environment exceeds a certain temperature. They might also include other actions such as changing the energy flow rate depending on the lithium cell electrochemical state, for protection of the lithium cell or safety reasons.

In some embodiments, measurements of the lithium cell's behavior under charge and discharge conditions are also used to update the cell model on board the microcontroller. The updated model in turn is used to predict state of charge as well as cell cycle lifetime, both of which are generally difficult to estimate but very useful knowledge for the load device. Many load devices (e.g. consumer electronics) have a method of indicating the state of charge to the user, and accuracy is important for determining the load device's run time.

State of Charge (SOC)

During operation, the microcontroller computes a number of important operational parameters, including for example the State of Charge (SOC) and the State of Health (SHO).

Figure 5:
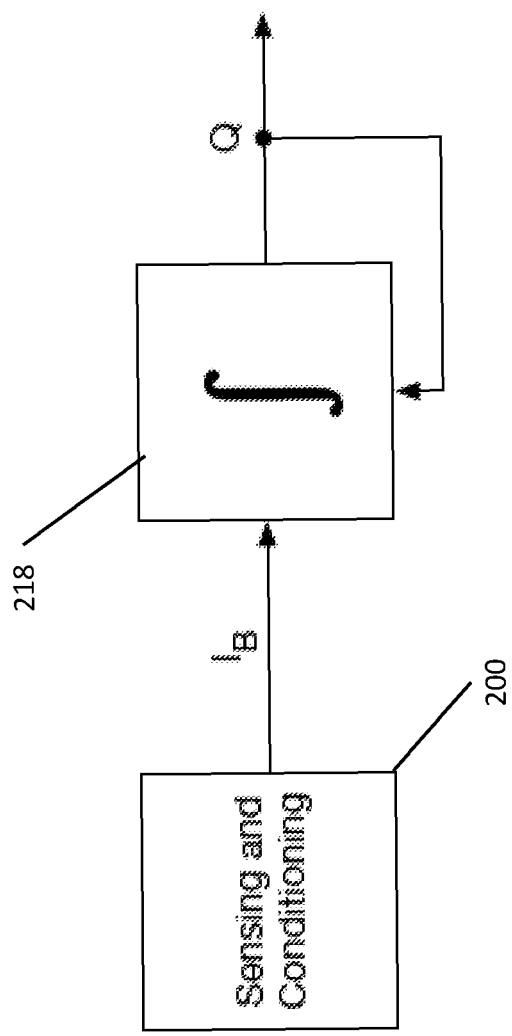
FIG. 5 is a flow chart of the state of charge estimator.

In the described embodiment, the microcontroller computes the state of sharge in the straightforward and simple way illustrated in FIG. 5. In essence, the microcontroller performs charge counting using an integrator 218. Using the current measurement provided by the current sensors that monitor the current into or out of the cell (block 200), the microcontroller integrates those values over time to compute state of charge. The computed value is written to the registers so that it is available to the load device over the communications bus and it is used internally by the microcontroller to monitor the charging and discharging processes.

In an alternative embodiment, such as one that employs the more sophisticated model of the cell dynamics as described in U.S. 2012/0098481, the model generates a more accurate measure of the state of charge based on continuous monitoring of the operation parameters of the cell.

State of Health (SOH)

In the described embodiment, the State of Health (SOH) for the energy storage cell is determined as follows:

$$SOH=(C_i/C_0) \times 100$$

where $C_i$ is the measured capacity of the cell when last fully charged and $C_0$ is the original rated capacity of the cell. There are other, more sophisticated techniques for estimating SOH that can be implemented in other embodiments. But in any case, SOH is information that is useful to report to the user, as it is another measure of how much life may be left in the cell and how frequently the cell may need to be charged.

State Diagram

Figure 6B:
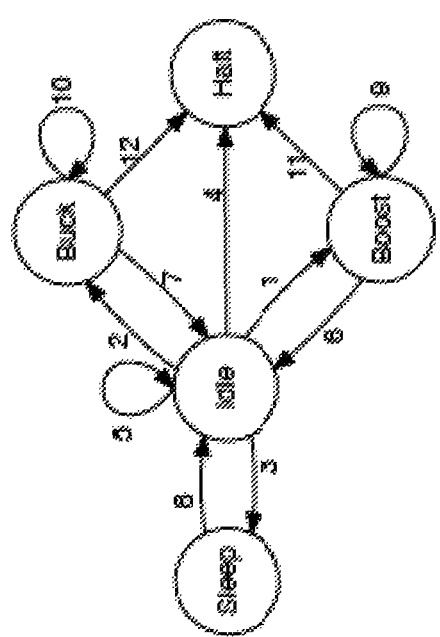
FIG. 6B is a state diagram of the operation of the super-cell.
Figure 6A:
FIG. 6A is a block diagram showing labeling the nodes referred to in the state diagram.

With the aid of FIGS. 6A-C, the operation of the super cell will now be described. Among those figures, FIG. 6B presents a state diagram depicting the behavior of the super-cell under the control of the software or code that is running on the microcontroller; FIG. 6C shows in chart form the conditions which trigger the transitions shown in FIG. 6B; and FIG. 6A provides a key to understanding the subscripts on the parameters and states referenced in the chart of FIG. 6B, showing subscript "A" identifies the parameter as relating to the load device (i.e., at the high power interface) and subscript "B" identifies the parameter as relating to the cell So, for example, the voltage $V_A$ is the voltage present on the power terminals to which the load device is connected and $I_B$ is the current to or from the cell.

Referring to FIG. 6B, there are five operational states for the super-cell, namely, Sleep, Idle, Buck, Boost, and Halt.

In the Sleep state, the super-cell is placed in a low power mode to conserve the energy stored in the cell.

Since microprocessor typically operates across a range of power levels, in order to minimize power consumption, individual subsystems and peripherals are powered-off or suspended when not in use (e.g. when in the Sleep state). External events or internal low-power timers are configured to trigger interrupts that cause the microprocessor to shift from a low-power hibernation mode to either a partial- or fully-operational state (e.g. the Idle state) in a several microseconds.

In the Idle state, the microcontroller is actively monitoring various sensors and checking for commands and/or conditions that require a transition to any of the other four states. In the Boost state, the microcontroller causes the power electronics to go into a boost converter mode and supply power to the load device (a discharging operation). In the Buck state, the microcontroller causes the power electronics to go into a buck converter mode and charge the cell from power supplied to the power terminal by the load device (a charging operation). And in the Halt state, normal operation of the system is stopped as a result of the occurrence of a detected problem or fault.

In the Idle state the processor repeatedly (link 5) checks for the presence of any commands or conditions that would require it to change state to either activate the buck converter circuitry to perform a charging of the cell, or activate the boost converter to supply power to the host device from the cell. During this Idle state, the processor also updates and checks, among other things: the temperature of the cell; the state of health (SOH) for the cell; the state of charge (SOC); the voltage at the power terminals, $V_A$; and the voltage at the cell, $V_B$.

The microcontroller in the super-cell maintains a number of limits on parameters and state variables that are either provided or computed for the connected lithium cell. The parameters and state variables include:

$V_{A,min}$—the minimum voltage that is required at the power terminals to enable charging to take place.

$V_{A,max}$—the maximum permissible voltage at the power terminals beyond which damage would occur to the lithium cell $V_{A,max\text{-}boost}$—the maximum boost voltage that can be safely provided to the load device.

$V_{B,min}$—the minimum voltage required from the cell before charge can be provided to the load device.

$V_{B,max}$—the voltage of the cell at which it is deemed to be fully charged.

$I_{B,max}$—the upper limit on the current that can be provided to the cell without causing damage to the cell.

$I_{B,min\text{-}boost}$—the current from to the cell below which it is not able to deliver power to the load.

$T_{max}$—the maximum temperature that the cell can operate safely and without risking damage to the cell.

$T_{min}$—the minimum temperature of the cell required to for it to operate.

$SOH_{min}$—the minimum required level of the state of health measure of the cell that is required for charging or discharging of the cell.

$SOC_{min}$—the state of charge required for the cell to provide power to the load.

Returning to FIG. 6C, while in the Idle state, if the processor senses that the voltage at the cell terminals is greater than $V_{B,min}$ and that it has received an appropriate command (e.g. via the communication interface) instructing it to provide power to the load device, the microcontroller transitions the super-cell to the Boost state (transition 1).

In the Boost state, the microcontroller operates the power electronics as a boost converter outputting the voltage requested by the load device via the communication interface, generates the appropriate control signals for causing the power electronics to deliver power to the load device at that voltage, monitors the relevant parameters and state variables, uses the cell model to determine and update model parameters, and checks relevant parameters and state variables against the limits established for the cell. As long as no condition is detected that requires a change of state, the microcontroller repeatedly cycles within the Boost state (transition 9), each time updating and checking the relevant parameters and state variables, while continuing to transfer power from the cell to the load device.

While in the Boost state, if the microcontroller detects any of the following conditions, it will transition the super-cell back to the Idle state (transition 6). The conditions are: (1) the voltage on the power terminals has exceeded $V_{A,max\text{-}boost}$, or (2) the current from the cell has fallen below $I_{B,min\text{-}boost}$ for a preselected period of time as determined by a one-shot timer, or (3) the temperature of the cell has fallen outside of the range defined by $T_{max}$ and $T_{min}$, or (4) the state of charge of the cell has fallen below $SOC_{min}$.

The one-shot timer is a countdown timer that does not reset upon reaching zero. In the described embodiment, the one-shot timeout is a 5 second countdown that proceeds to countdown so long as the current draw is below a certain threshold. If the timeout is able to reach 0, the transition to Idle state is triggered. If, at some point during the countdown, the current draw exceeds the threshold, the timeout is reset. This particular timeout is implemented to avoid wasting power by remaining in the Boost state when a load is not connected to the high-power interface 116.

While in the Boost state if the microcontroller detects any of the following conditions, it will transition the super-cell to the Halt state (transition 11). The conditions are: (1) the current from the cell exceeds $I_{B,max}$, or (2) the state of health of the cell has fallen below $SOH_{min}$, or (3) a watchdog timer expires. The watchdog timer is a count-down timer that allows the system to recover from instances when the software might hang or freeze. The watchdog timer is a hardware peripheral within the digital power controller that must be periodically reset by software running on the microcontroller. If the software fails to reset the watchdog before the latter counts down below a pre-defined threshold, the watchdog will trigger and register a fault, ultimately resulting in a system reset.

Referring again to the Idle state, if the microcontroller senses that all of the following conditions have been met, it will transition the super-cell to the Buck state (transition 2). The conditions are: (1) the voltage at the power terminals is greater than $V_{A,min}$; and (2) the voltage at the cell is less than $V_{B,max}$; and (3) the load device has delivered a command instructing the super-cell to begin charging the cell; and (4) the state of charge of the cell is less than 100%.

In the Buck state, the microcontroller configures the power electronics to operate as a buck converter to begin charging the cell from the power available through the power terminals. Using the cell model that is stored in its memory, the microcontroller generates the appropriate switching signals for causing the power electronics to deliver charge to the cell. It also monitors the relevant parameters and state variables, uses the cell model to determine and update model parameters, and checks relevant parameters and state variables against the limits established for the cell. As long as no condition is detected that requires a change of state, the microcontroller repeatedly cycles within the Buck state (transition 10), each time updating the model, and updating and checking the relevant parameters and state variables, while continuing to charge to the cell in accordance with the model of the cell.

While in the Buck state, if the microcontroller detects that any of the following conditions have occurred, it will transition the super-cell back to the Idle state (transition 7). The conditions are: (1) the voltage on the power terminals has fallen below $V_{A,min}$; or (2) the temperature of the cell has fallen outside of the range defined by $T_{max}$ and $T_{min}$; or (3) the state of charge of the cell has reached 100%.

On the other hand, if the microcontroller detects any of the following conditions, it will transition the super-cell to the Halt state (transition 12). The conditions are: (1) the voltage at the power terminals has exceeded $V_{A,max}$; or (2) the state of health of the cell has fallen below $SOH_{min}$; or a corresponding watchdog timer has timed out.

Returning again to the Idle state, if the microcontroller detects inactivity for a sufficiently long period of time as determined by a one-shot timer, it will transition the super-cell to the Sleep state (transition 3) where it will enter a low power mode to conserve energy. After being in the Sleep state for a period of time determined by another one-shot timer, the microcontroller will transition the super-cell to the Idle state (transition 8) in which the microcontroller checks various operational parameters.

While in the Idle state, in addition to checking for conditions that call for a transition to either the boost mode or the buck mode, the microcontroller also checks for conditions that signal a fault or unsafe condition. If the microcontroller detects any of the following conditions, it will transition the super-cell to the Halt state (transition 4). The conditions are: a cell temperature that is greater than $T_{max}$; a state of health that is less than $SOH_{min}$; or a corresponding watchdog timer had timed out.

Registers

Referring to FIG. 7, there is a set of registers in the super-cell for storing key parameters that are readable by the load device over the digital I/O bus 106. The stored parameters include: the time associated with the other stored values, TIME; the voltage $V_A$ that is being provided to the load the load device by the power electronics; the voltage $V_B$ of the energy storage cell; the current $I_B$ delivered to the energy storage; the temperature T of the energy storage cell; the state of charge (SOC) for the energy storage cell; the state of health (SOH) for the energy storage cell; and a set of parameters PARAM0 . . . PARAM2 . . . characterizing the coefficients of the model.

The load device can interrogate the microprocessor about what range of voltages are supported at the power terminals. Based on that information, the load device selects the output voltage that it requires, assuming of course that the desired voltage is within the operating range of the super-cell, and writes the selected output voltage to the $V_A$ register thereby instructing the microcontroller to output that voltage at the power terminals.

As should be apparent, the super-cell microcontroller contains intellectual property in the form of microprocessor code, models, and model parameters. This information, as digital code, is a simple attack vector for anyone attempting to duplicate the system. To provide some protection for this sensitive data (e.g. the set of parameters PARAM0 . . . PARAM2 . . . characterizing the coefficients of the model), it is stored in volatile memory. If the power is interrupted, the sensitive data stored in volatile memory will automatically be deleted.

Alternatively, or in addition, the microcontroller uses information gathered from the onboard sensors to determine whether or not the packaging is damaged, intentionally or not. If the microcontroller determines that the packaging has been maliciously or intentionally breached, it erases proprietary information from working memory and flash ROM. Various mechanisms for detecting reverse engineering or improper access to proprietary digitally stored information are known and can be employed to implement this functionality.

Figures 8, 9:
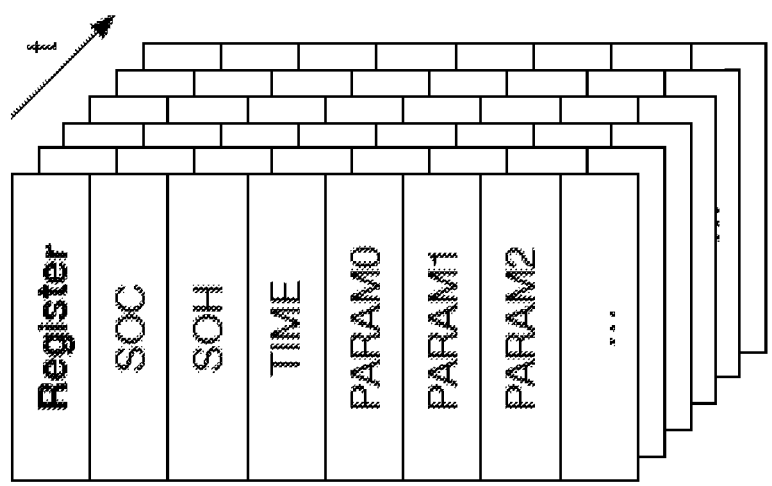
FIG. 8 depicts the history that is maintained within the appropriate registers within the super-cell.
FIG. 9 is an exemplary specification for a super-cell.

As exemplified by FIG. 8, the microcontroller tracks in time certain register values to generate a history for the super-cell. In the illustrated example, each record of that history includes values SOC, SOH, TIME, and PARAM0 . . . PARAM2. The load device, via communications over the internal communication bus, can also read these registers.

A Single, Integrated, Standalone Unit

Referring to FIG. 2, the microcontroller 102, sensors 104, and all power electronics 108 and 112 are mounted on a printed circuit board (PCB) 300. And the energy storage cell plus the PCB, along with its mounted electronics, are packaged together to form a single, integrated, stand-alone unit. Consequently, the cell model and operational limits that are specific to the energy storage cell, and the super-cell electronics, which are matched to the lithium cell, are packaged with, and subsequently never separated from, the energy storage cell.

In the described embodiment, as indicated in FIGS. 10A-C, the energy storage cell 400 and the PCB 402 with its electronics are encapsulated in epoxy 404 to produce a mechanically robust, multi-terminal device that is used as a single component. On one end, terminal pads are present for connection to the load device. Two pads 408 are the high power terminals, two pads 410 are the low power output terminals, and two pads 412 are the connections to the I/O bus. The two pads form a port through which the external device communicates with the super-cell over the communication but.

Figure 11:
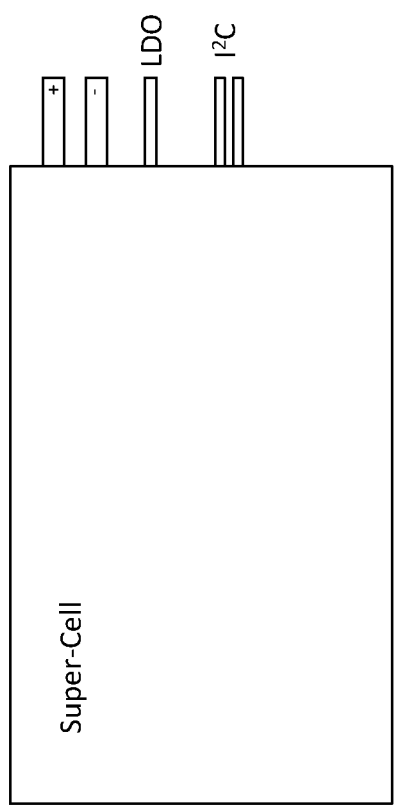
FIG. 11 is an alternative embodiment of the super-cell in which the energy storage cell and the electronics are contained within a housing.

FIG. 11 shows in schematic form another packaging arrangement for the super-cell. In this example, the energy storage cell and the PCB with its electronics (not visible in the figure) are completely enclosed within a metal or plastic housing 310 that surrounds the internal components. In this example, the terminals are shown as conducting leads extending out of the package, though they could just as well have been contact pads on an end face of the package.

FIG. 9 shows a specification for an exemplary embodiment of the super-cell.

Multi-Cell Embodiment of a Super-Cell

Though the above-described super-cell had only one energy storage cell within it, the super-cell may include multiple energy storage cells connected in series, in parallel, or in a combination thereof. Cell voltages and cell SOC may change slightly between cells as either the capacity changes with time and past environmental conditions. Cells from different batches may have slightly different capacities. Cells may not degrade uniformly if some cells are exposed to higher temperatures than others due to unequal thermal management or subject to heat gradient. The cell capacity also changes for cells at different temperatures. When cells with different characteristics are charged some may increase in voltage faster than others. For cells in series, cells with smaller capacities charge more rapidly than others and reach their maximum rated voltage before that the whole pack reaches its nominal voltage. It is important not to overcharge any cell when this condition occurs and to stop charging. The process of cell equalization brings all the cells to the same voltage.

In the multi-cell, super-cell, the onboard switching electronics can be used to provide battery management functionality which individually discharges cells whose voltage approaches limits. Also, as previously mentioned, cells should not be charged when the internal temperature is below the freezing point. Before charging an energy storage medium at an ambient temperature of below 0° C. it is necessary to raise the energy storage medium temperature as described above.

General-purpose digital pins on the microcontroller may serve to drive the gates or base terminals of transistors that are used for cell balancing, cell heating, and/or energy conversion.

The Power Bank

Figure 12:
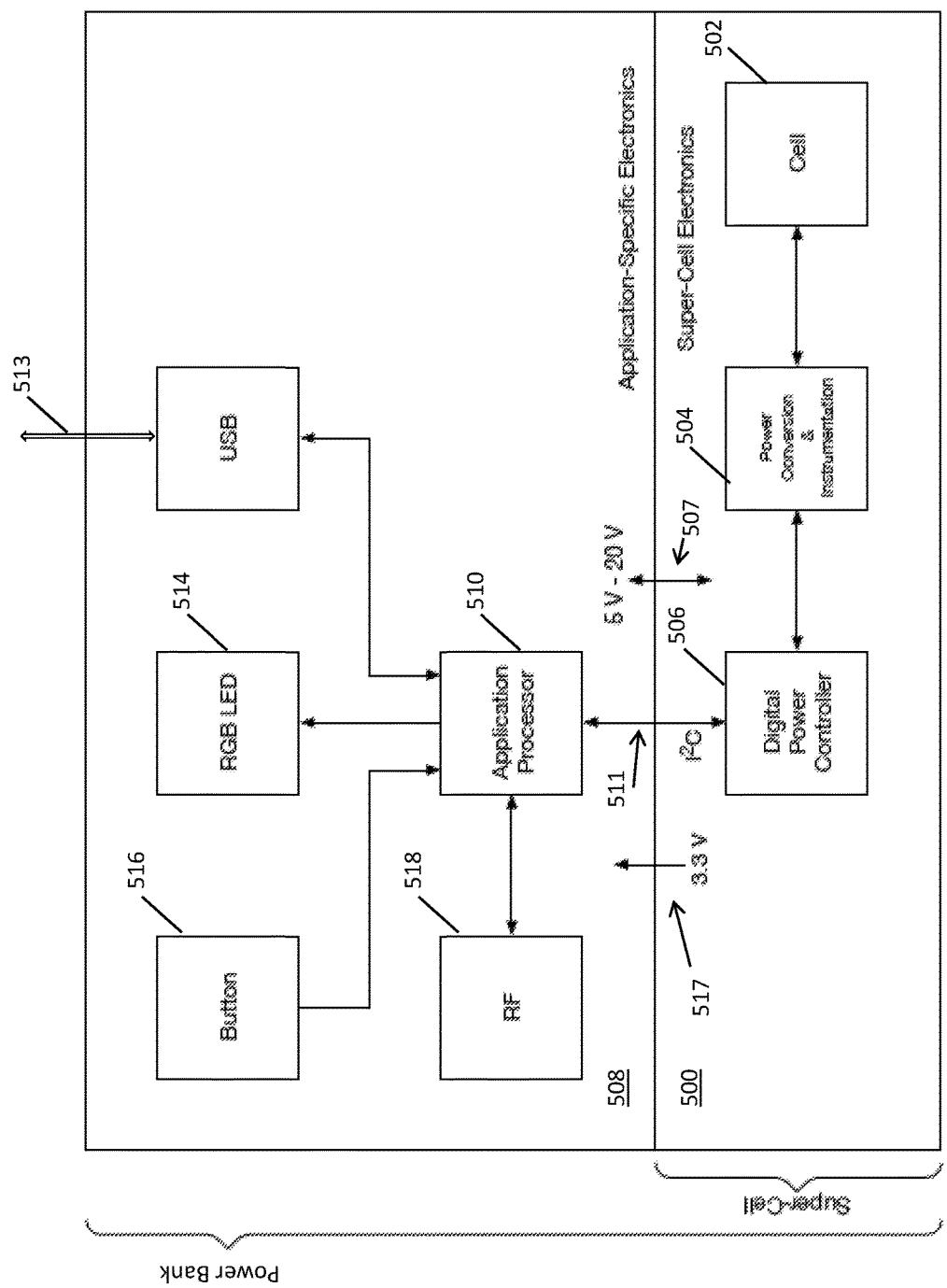
FIG. 12 is a block diagram of a power bank that incorporates the super-cell.

A very simple example of a super-cell being used as part of a larger system is illustrated in FIG. 12, which depicts a consumer power bank. The power bank is an energy storage system typically used to recharge consumer electronics when no other power source is available (e.g. wall plug).

The super-cell 500, which forms the core of the power bank, is combined with and supplied the power for a load device 508, referred to here alternatively as application-specific electronics. Most of the functionality of the power bank is contained within the super-cell 500, and the remaining circuitry within the load device 508, due to the super-cell abstraction, simply serves as a user interface and user communications port. The super-cell 500 includes an energy storage cell 502, power conversion and instrumentation circuitry 504, and a digital power controller 506. It also includes power terminals 507 for providing power to the load device and for receiving charge from the load device when in a charging mode. It includes low power terminals 507 for providing keep alive power to the load device. And it includes an I/O bus 511 for communication with the load device by using the I$^2$C communication protocol. In the described embodiment, the super cell 500 can provide any voltage to the load device in the range of 5-20 volts (selectable by the load device) and it provides low power to the load device at 3.3 volts.

The load device 508 has an application processor 510, a Bluetooth transceiver 518, and a USB-C transceiver 512 connected to a single USB Type-C port 513. The power bank also uses a single button 516 for user input and control, RGB LED's 514 for indicating states of operation to the user. In the described embodiment the application processor and Bluetooth transceiver are implemented by a Nordic Semiconductor nRF52 Bluetooth transceiver/microprocessor.

The application processor 510 controls the power bank functions and communicates with the super-cell 500. When the power bank is discharging (i.e., charging an external load), the super-cell 500 is asked to output a 5 VDC voltage level for use. When the power bank is charging (i.e., plugged into an external charge source), the super-cell 500 is asked to charge its energy storage cell 502 from the available energy.

The application processor 510 also makes a Bluetooth connection to a user's mobile phone, if available, to transmit and receive data from a web-based database for the purpose of data logging and firmware updating.

It should have become apparent that the super-cell gathers information about charge and discharge usage that are of interest to the super-cell manufacturer. This includes information about how certain charge models perform over time, under use conditions, which is critical to improving future charge models.

Thus, though not necessary for proper operation of the super-cell, a load device may allow information from the super-cell to be communicated to e.g. an online database through the Bluetooth wireless communication channel, or other communications channels (e.g. WiFi, cell phone data connection, etc.). This same data connection would also enable the super-cell to receive periodic firmware updates from the same database.

It should be understood that the above-described operations of the microcontroller, the functionality illustrated in the state diagram, and the processes described in connection with the software flow may be implemented through program code running on a microprocessor and/or through one or more appropriately programmed Field-Programmable Gate Arrays (FPGA).

Other embodiments are within the following claims. For example, the energy storage cell might be any rechargeable energy storage cell including, without limitation, a supercapacitor, an ultra-capacitor, a hybrid capacitor, or a pseudo-capacitor. In addition, the sensors described above can be used in ways not described herein to manage the operation of the super-cell and provide useful information to the load device (e.g. for presentation to a user) or to the super-cell manufacturer for diagnostic purposes and for improving the performance of the super-cells and improving the models used for operation of future super-cells.

What is claimed is:

1. An energy storage system for use with an external device, said energy storage system comprising:
    an energy storage cell;
    a microcontroller;
    an internal communication bus over which the external device can communicate with the microcontroller;
    an interface through which the external device electrically connects to the energy storage system, said interface including two power terminals and a communications port electrically connected to the internal communication bus;
    power conversion circuitry connected between the power terminals and the energy storage cell, said power conversion circuitry for performing a charging operation during which energy is transferred from the power terminals to the energy storage cell and a discharging operation during which energy is transferred from the energy storage cell to the power terminals; and
    one or more sensors for monitoring one or more parameters of the energy storage cell,
    wherein the microcontroller is programmed to control the operation of the power conversion circuitry during the charging and discharging operations based on the one or more monitored parameters of the energy storage cell, and
    wherein the energy storage cell, the power electronics, the microcontroller, the interface, the internal communication bus, and the one or more sensors are packaged to form a single, integrated unit.

2. The energy storage system of claim 1, further comprising an epoxy encapsulating the energy storage cell, the power conversion electronics, the microcontroller, the interface, the internal communication bus, and the one or more sensors to create the single, integrated unit.

3. The energy storage system of claim 1, further comprising a housing surrounding and containing the energy storage cell, the power conversion electronics, the microcontroller, the interface, the internal communication bus, and the one or more sensors to create the single, integrated unit.

4. The energy storage system of claim 1, wherein the microcontroller is programmed to employ a charging model and the monitored one or more parameters from the one or more sensors to control the power electronics when performing the charging operation.

5. The energy storage system of claim 1, wherein microcontroller is programmed to operate the power conversion electronics as a boost converter during the discharging operation.

6. The energy storage system of claim 1, wherein microcontroller is programmed to operate the power conversion electronics as a buck converter during the charging operation.

7. The energy storage system of claim 1, further comprising a low power supply that is part of the single, integrated unit and wherein the interface includes low power terminals electrically connected to the low power supply.

8. The energy storage system of claim 1, wherein the energy storage cell is a lithium cell.

9. The energy storage system of claim 1, wherein the one or more sensors are selected from the group consisting of a voltage sensor arranged to sense a voltage of the energy storage cell, a current sensor arranged to sense a current of the energy storage cell, a reference electrode within the energy storage cell, and a temperature sensor arranged to sense a temperature of the energy storage cell.

10. The energy storage system of claim 1, wherein the one or more sensors include a voltage sensor arranged to sense a voltage of the energy storage cell, a current sensor arranged to sense a current of the energy storage cell, a reference electrode within the energy storage cell, and a temperature sensor arranged to sense a temperature of the energy storage cell.

11. The energy storage system of claim 1, wherein the internal communication bus is a digital communication bus.

12. The energy storage system of claim 1, further comprising a communication protocol for communications over the communication bus, wherein the communication protocol is an $I^2C$ communication protocol.

13. The energy storage system of claim 1, further comprising a plurality of registers which during operation store one or more of the one or more monitored parameters of the energy storage cell, wherein at least some of the plurality of registers are readable by the load device via the internal communication bus.

14. The energy storage system of claim 13, wherein during operation the plurality of registers stores a state of charge for the energy storage cell.

15. The energy storage system of claim 13, wherein the plurality of registers includes a subset of registers for storing parameters characterizing a charging model that the microcontroller uses to control the charging operation.

16. The energy storage system of claim 15, wherein the subset of registers is in volatile memory.

17. The energy storage system of claim 1, wherein the microcontroller is further programmed to use the one or more monitored parameters of the energy storage cell to compute a state of charge for the energy storage cell.

18. The energy storage system of claim 1, wherein the microcontroller is further programmed to compute a state of health for the energy storage cell and use the computed state of health to manage the charging operation.

19. The energy storage system of claim 18, wherein the state of health is based on a energy storage capacity of the energy storage cell as determined by the microprocessor.

20. The energy storage system of claim 1, wherein the power conversion circuitry comprises a bidirectional half-bridge conversion circuit.

21. The energy storage system of claim 1, wherein the microcontroller is further programmed to perform critical limit checks using the one or more monitored parameters.

22. The energy storage system of claim 1, wherein the microcontroller is further programmed to perform fault handling if a problem in operation is detected.

* * * * *